(12) United States Patent
Coquillat

(10) Patent No.: US 11,511,864 B2
(45) Date of Patent: Nov. 29, 2022

(54) ROTORCRAFT EQUIPPED WITH AN AERODYNAMIC DEVICE HAVING A FAIRING PROVIDED WITH AN AIR INTAKE

(71) Applicant: AIRBUS HELICOPTERS, Marignane (FR)

(72) Inventor: Jean-Christophe Coquillat, Fuveau (FR)

(73) Assignee: AIRBUS HELICOPTERS, Marignane (FR)

( * ) Notice: Subject to any disclaimer, the term of this patent is extended or adjusted under 35 U.S.C. 154(b) by 239 days.

(21) Appl. No.: 16/846,680

(22) Filed: Apr. 13, 2020

(65) Prior Publication Data
US 2020/0346759 A1    Nov. 5, 2020

(30) Foreign Application Priority Data

Apr. 30, 2019 (FR) ..................................... 1904544

(51) Int. Cl.
*B64D 13/00* (2006.01)
*B64C 27/00* (2006.01)
*B64D 33/08* (2006.01)

(52) U.S. Cl.
CPC ............ *B64D 13/006* (2013.01); *B64C 27/00* (2013.01); *B64D 33/08* (2013.01)

(58) Field of Classification Search
CPC ........ B64D 13/006; B64D 33/08; B64C 27/00
USPC ..................................................... 244/117 A
See application file for complete search history.

(56) References Cited

U.S. PATENT DOCUMENTS

| 2,995,317 | A | * | 8/1961 | Schoppe | ................... B64C 9/38 60/228 |
| 3,033,493 | A | * | 5/1962 | Wilde | ................. B64C 29/0058 244/23 R |
| 3,292,864 | A | * | 12/1966 | Edkins | .................... B64C 15/02 D12/330 |
| 3,678,691 | A | * | 7/1972 | Shohet | .................... F02K 3/075 60/226.3 |
| 3,770,228 | A | * | 11/1973 | Traksel | .................... F02C 7/042 137/15.1 |
| 3,910,529 | A | * | 10/1975 | Putnam | ............... B64C 29/0025 244/12.3 |

(Continued)

FOREIGN PATENT DOCUMENTS

| EP | 0283578 A2 | 9/1988 |
| EP | 0283578 A3 | 2/1990 |
| EP | 3106646 A1 | 12/2016 |

*Primary Examiner* — Brady W Frazier
(74) *Attorney, Agent, or Firm* — Brooks Kushman P.C.

(57) ABSTRACT

A rotorcraft having an aerodynamic device arranged below a rotor, which rotor participates at least in providing lift for the rotorcraft in the air, the rotor being mounted to rotate about a first axis of rotation, the aerodynamic device having a fairing provided with at least one air inlet for enabling a stream of cool air to flow from a region that is situated outside the rotorcraft to another region that is situated inside the rotorcraft; at least at a mouth of the at least one air inlet in the fairing, the aerodynamic device has at least one moving flap that is mounted to move in rotation, the at least one moving flap having at least one degree of freedom of movement in rotation about a second axis of rotation relative to the fairing, and the at least one moving flap orienting itself automatically and passively.

18 Claims, 3 Drawing Sheets

(56) References Cited

U.S. PATENT DOCUMENTS

| | | | |
|---|---|---|---|
| 4,203,566 A | 5/1980 | Lord | |
| 4,828,203 A * | 5/1989 | Clifton | B64C 29/0033 |
| | | | 244/12.3 |
| 4,830,312 A | 5/1989 | Hain et al. | |
| 4,865,268 A * | 9/1989 | Tracksdorf | F02C 7/042 |
| | | | 137/15.2 |
| 5,351,911 A * | 10/1994 | Neumayr | B64C 39/06 |
| | | | D12/325 |
| 5,586,735 A * | 12/1996 | Falempin | F02C 7/042 |
| | | | 137/15.1 |
| 5,865,398 A | 2/1999 | Pashea et al. | |
| 6,123,296 A * | 9/2000 | Mangalam | B64C 21/10 |
| | | | 244/206 |
| 6,561,456 B1 * | 5/2003 | Devine | B64C 29/0025 |
| | | | 244/12.3 |
| 7,344,107 B2 * | 3/2008 | Campbell | F02C 7/04 |
| | | | 244/58 |
| 2005/0178881 A1 * | 8/2005 | Yoeli | B64C 29/0025 |
| | | | 244/12.1 |
| 2010/0221104 A1 * | 9/2010 | Light | F02C 7/047 |
| | | | 415/208.1 |
| 2011/0151764 A1 | 6/2011 | Kastell et al. | |
| 2014/0295747 A1 * | 10/2014 | Schmid | B64D 13/00 |
| | | | 454/76 |
| 2018/0134375 A1 * | 5/2018 | Christman | B64C 25/42 |
| 2019/0033932 A1 * | 1/2019 | Ku | H05K 7/20145 |
| 2019/0338728 A1 * | 11/2019 | Hussain | F02C 7/18 |

* cited by examiner

ROTORCRAFT EQUIPPED WITH AN AERODYNAMIC DEVICE HAVING A FAIRING PROVIDED WITH AN AIR INTAKE

CROSS-REFERENCE TO RELATED APPLICATIONS

This application claims priority to European patent application No. FR 1904544 filed on Apr. 30, 2019, the disclosure of which is incorporated in its entirety by reference herein.

BACKGROUND OF THE INVENTION

(1) Field of the Invention

The present invention relates to the field of aviation and more particularly to the field of rotorcraft. Such aircraft have at least one rotor equipped with blades making it possible to provide lift for an aircraft, or indeed propulsion for the aircraft, in the air.

More precisely, the invention applies to the field of aerodynamic devices that are arranged on the fuselage or outer skin of such a rotorcraft. Such an aerodynamic device may have a fairing making it possible, for example, to protect an engine and/or a main gearbox of a rotorcraft.

(2) Description of Related Art

Furthermore, and as described, in particular, by Document EP 0 283 578, such fairings may be provided with one or more cool air inlets making it possible, for example, for outside air to penetrate into the fuselage of the rotorcraft in such a manner as to cool a coolant fluid circulating in a heat exchanger, or indeed in such a manner as to feed an engine of the rotorcraft with oxygen. Such air inlets may be provided with grids, bars, or fixed slats for advantageously orienting the stream of incoming air.

However, the cool air can be sucked in at different pressure levels at the air inlets. The inlet pressure of the stream of cool air can vary, in particular as a function of the suction generated by a suction member such as a motor or a fan situated downstream from the air inlet or indeed as a function of the balance conditions of the rotorcraft that fluctuate depending on the type of flight of the rotorcraft, which flight can, for example, be hovering, rectilinear, or "sideslipping".

In addition, the size of the mouth of the air inlet situated on the fuselage is particularly complex to dimension.

When the rotorcraft is hovering, a large mouth for the air inlet makes it possible to minimize the head losses and thereby to guarantee optimum operation of the fed member, such as, for example, a heat exchanger or an engine, fed with cool air by such an aerodynamic device.

However, during a forward flight phase, a large mouth can generate uncontrolled delivery of cool air at an excessive flow rate, and can cause non-negligible capture drag with a risk of vibration on the tail boom and/or poor cooling of a heat exchanger.

Conversely, with a mouth of small dimensions, while the rotorcraft is hovering, head losses take place at the mouth. That then adversely affects the performance of a fan and results in poor cooling of a heat exchanger.

Furthermore, while the rotorcraft is flying in forward flight, a mouth of small dimensions makes it possible to minimize the flow rate of cool air delivered via the air inlet and thus to minimize the risks of wakes forming and/or of capture drag occurring.

Thus, the size of the mouth is determined as a function of a compromise making it possible, in particular to feed cool air optimally while the rotorcraft is hovering and/or while the rotorcraft is in forward flight.

Such a compromise can therefore induce restrictions as regards the performance of a rotorcraft and/or in terms of aerodynamic design of the fairing in general, and more specifically of the air inlet.

Furthermore, in technical fields other than the field of rotorcraft, it is known that a moving flap can be controlled by an actuator for the purpose of orienting flaps at the mouth an air inlet. Documents US 2011/0151764, U.S. Pat. No. 4,203,566, EP 3 106 646, and U.S. Pat. No. 5,865,398 disclose such actuators.

However, such actuators and their respective controls can be defective and can fail. In the event of failure, such flaps can then be held stationary in the closed position by the actuators. Such an arrangement is therefore not optimal in terms of performance and of safety.

BRIEF SUMMARY OF THE INVENTION

Therefore, an object of the present invention is to propose a rotorcraft equipped with an aerodynamic device having a fairing provided with an air inlet that has a mouth that is optimized for the various flight phases of the rotorcraft.

The invention therefore provides a rotorcraft having an aerodynamic device arranged below a rotor, which rotor participates at least in providing lift for the rotorcraft in the air, the rotor being mounted to rotate about a first axis of rotation OZ, the aerodynamic device having a fairing provided with at least one air inlet for enabling a stream of cool air to flow from a region that is situated outside said rotorcraft to another region that is situated inside the rotorcraft.

In accordance with the invention, such a rotorcraft is remarkable in that at least at a mouth of the air inlet in the fairing or at each of mouths of the air inlets in the fairing, the aerodynamic device has at least one moving flap that is mounted to move in rotation, the moving flap/each of the moving flaps having at least one degree of freedom of movement in rotation about a second axis of rotation $O_1Y_1$, $O_2Y_2$, $O_3Y_3$ relative to the fairing, the moving flap/each moving flap orienting itself automatically and passively as a function of a current orientation of the stream of cool air at the mouth of the air inlet, and the second axis of rotation $O_1Y_1$, $O_2Y_2$, $O_3Y_3$ being arranged in a plane $X_1O_1Y_1$, $X_2O_2Y_2$, $X_3O_3Y_3$ that extends perpendicularly relative to the first axis of rotation OZ.

In other words, the size of the cross-sectional area through which the cool air passes at the mouth may be adapted automatically as a function of the flow-rate and of the orientation of the stream of air at the mouth of the air inlet. In this way, the moving flap(s) makes/make it possible, while the rotorcraft is hovering, to maximize the suction cross-sectional area at the mouth, and therefore to limit the speed of flow of the stream of air into the air inlet.

Such a cross-sectional area through which cool air can pass at the mouth depends on the orientation of the stream of air because the mouth of the air inlet points towards a front region of the rotorcraft while being inclined upwards, in a vertical plane arranged perpendicularly relative to the second axis of rotation $O_1Y_1$, $O_2Y_2$, $O_3Y_3$. Such an inclination of the mouth may, for example, lie in the range 1° to 89°, and preferably lie in the range 20° to 60°, relative to an axis in elevation $O_1Z_1$, $O_2Z_2$, $O_3Z_3$ in the plane $X_1O_1Z_1$, $X_2O_2Z_2$, $X_3O_3Z_3$.

Furthermore, the head losses at the air inlet are then low and, at the outlet from the air inlet, cooling of heat exchangers can be optimized and/or cool air admission into the engines can be optimum.

Moreover, such an aerodynamic device makes it possible, while the rotorcraft is flying in forward flight, to provide a reduced suction area making it possible to minimize excessive flow-rate of air and, therefore to minimize the capture drag of a rotorcraft equipped in this way.

The moving flap or each of the moving flaps is therefore suitable for orienting itself freely about its second axes of rotation $O_1Y_1$, $O_2Y_2$, $O_3Y_3$, e.g. as a function of a main orientation of the stream of cool air or of a pressure exerted by the stream of cool air on its respective surface. In addition, the term "passively" should be understood as meaning that no motor is used to cause the angular orientation of one or more moving flaps to change.

Naturally, such an aerodynamic device may include one or more moving flaps, each of which has at least one degree of freedom of movement in rotation about the second axis of rotation $O_1Y_1$, $O_2Y_2$, $O_3Y_3$ relative to the fairing. When the aerodynamic device has at least two moving flaps, the degrees of freedom of movement in rotation of the moving flaps may be mutually constrained or mutually independent.

Thus, in a first embodiment of the invention, the moving flaps may include a first moving flap and a second moving flap, the first and second moving flaps being free to orient themselves individually to take up at least two angular orientations that are mutually distinct about respective ones of the second axes of rotation $O_1Y_1$, $O_2Y_2$, $O_3Y_3$.

In other words, in this situation, the first and second flaps are not interconnected and each of them can pivot freely about the respective one of the second axes of rotation $O_1Y_1$, $O_2Y_2$, $O_3Y_3$.

Thus, in a second embodiment of the invention, the moving flaps may include a first moving flap and a second moving flap, the first and second moving flaps pivoting together into the same angular orientation about respective ones of the second axes of rotation $O_1Y_1$, $O_2Y_2$, $O_3Y_3$.

In this other situation, the first and second flaps are therefore interconnected, e.g. by connecting rods, and they then pivot simultaneously in the same direction about respective ones of the second axes of rotation $O_1Y_1$, $O_2Y_2$, $O_3Y_3$.

Furthermore, the degrees of freedom of movement in rotation that the moving flap(s) have may be implemented in different ways and, for example, may correspond to two variants of the invention that are described below. In these two variants, a bearing may include an inner ring and/or an outer ring and rolling bearing elements such as balls, rollers, or needle rollers. Such bearings may also be formed by rings or bushings made of a material having a low coefficient of friction such as bronze or polytetrafluoroethylene (PTFE).

Thus, in a first variant of the invention, the moving flap or each of the moving flaps may extend longitudinally between two facing faces that define the air inlet, a first end of the/of each moving flap co-operating with a first bearing arranged in a first face, and a second end of the/of each moving flap co-operating with a second bearing arranged in a second face, the first and second bearings being arranged in alignment on the second axis of rotation $O_1Y_1$, $O_2Y_2$, $O_3Y_3$.

In other words, in this situation, the first and the second bearings are arranged in a region of the fairing while being offset laterally on either side of the/of each moving flap.

Thus, in a second variant of the invention, the moving flap or each of the moving flaps may extend longitudinally between two facing faces that define the air inlet, a first end of the/of each moving flap co-operating with a first bearing arranged on a stationary pin passing through the/each moving flap, and a second end of the/of each moving flap co-operating with a second bearing arranged on the stationary pin, the first and second bearings being arranged in alignment on the second axis of rotation $O_1Y_1$, $O_2Y_2$, $O_3Y_3$.

In this other situation, the first and second bearings are arranged in the air inlet between the two facing faces. The stationary pin is then secured by connections of the interfitting engagement type to the two facing faces of the air inlet.

Advantageously, the moving flap(s) may include a first flap mounted to move in rotation about a second axis of rotation $O_1Y_1$ and a second flap mounted to move in rotation about another second axis of rotation $O_2Y_2$, the second axes of rotation $O_1Y_1$ and $O_2Y_2$ being arranged to be mutually parallel.

In other words, between two facing faces of the air inlet, two second axes of rotation $O_1Y_1$, $O_2Y_2$ may extend along respective ones of two parallel directions.

In practice, the moving flap or each of the moving flaps may include a first flap mounted to move in rotation about a second axis of rotation $O_1Y_1$, a second flap mounted to move in rotation about another second axis of rotation $O_2Y_2$ and a third flap mounted to move in rotation about another second axis of rotation $O_3Y_3$, the second axes of rotation $O_1Y_1$, $O_2Y_2$, $O_3Y_3$ of the first, second, and third moving flaps being arranged in coplanar manner.

In other words, all three second axes of rotation $O_1Y_1$, $O_2Y_2$, and $O_3Y_3$ may lie within the same plane that, for example, extends at the mouth of the air inlet.

Furthermore, the cross-section of each moving flap may be constant or otherwise along the respective second axis of rotation $O_1Y_1$, $O_2Y_2$, $O_3Y_3$.

Thus, in a first embodiment of the invention, the moving flap or each of the moving flaps may have a plurality of cross-sections that are perpendicular to the second axis of rotation $O_1Y_1$, $O_2Y_2$, $O_3Y_3$, each of the plurality of cross-sections having the same aerodynamic profile.

In other words, the profiles of the cross-sections may be of constant shape for any given moving flap.

In a second embodiment of the invention, the moving flap or each of the moving flaps may have a plurality of cross-sections that are perpendicular to the second axis of rotation $O_1Y_1$, $O_2Y_2$, $O_3Y_3$, the plurality of cross-sections having at least two mutually distinct profiles.

In this other situation, the profile of the cross-sections of any given moving flap may have different shapes. Said shapes then vary as a function of the position of the cross-section along the second axis of rotation $O_1Y_1$, $O_2Y_2$, $O_3Y_3$.

In other words, the flaps of the same aerodynamic device may be different from one another or they may be the same as one another.

Thus, in a first alternative, the moving flap(s) may include a first moving flap and a second moving flap, the first and second moving flaps being mutually identical.

In this way, the flaps are made easier to manufacture and to assemble to form an aerodynamic device. Similarly, in the event that one of the flaps is damaged, the handling and replacement operations are made simpler by such use of mutually identical flaps.

In a second alternative, the moving flap(s) may include a first moving flap and a second moving flap, the first and second moving flaps being distinct from each other.

Such an arrangement may offer the advantage of maximizing the aerodynamic performance of such an aerodynamic device.

Furthermore, said moving flap(s) may have different shapes.

In a first embodiment, the moving flap(s) may be of a streamlined type, the moving flap or each of the moving flaps having firstly a top skin and a bottom skin and secondly a leading edge interconnecting the top skin and the bottom skin and a trailing edge interconnecting the top skin and the bottom skin, the leading edge and the trailing edge extending substantially longitudinally along the second axis of rotation $O_1Y_1$, $O_2Y_2$, $O_3Y_3$.

Such an arrangement may offer the advantage of improving the aerodynamic drag performance of such an aerodynamic device. Another advantage of this streamlined shape is that it facilitates the self-alignment of the moving flaps relative to the stream of cool air penetrating into the air inlet.

In a second embodiment, the moving flap V1' may also have a plane shape extending substantially longitudinally along the second axis of rotation $O_1Y_1$, $O_2Y_2$, $O_3Y_3$.

Such a plane shape is very simple to achieve and thus offers a financial advantage for manufacturing the flaps. This shape may, for example be achieved by cutting out from a plate or from an elongate member that is obtained, for example, by an extrusion method. In this situation, the plane shape does not therefore require manufacturing molds to be fabricated that are dedicated and adapted to the moving flaps.

Advantageously, for each moving flap, the aerodynamic device may have at least one abutment member suitable for angularly limiting the degree(s) of freedom of movement in rotation relative to the fairing.

In other words, such an abutment member makes it possible control at least one extreme angular orientation for each moving flap about a respective one of the second axes of rotation $O_1Y_1$, $O_2Y_2$, $O_3Y_3$. Thus, such an abutment member can make it possible to limit the risks of interference between each moving flap and the fairing of the air inlet or other peripheral elements.

In practice, the moving flap or each moving flap may have a center of gravity, the center of gravity being arranged in such a manner as to be offset radially relative to said second axis of rotation $O_1Y_1$, $O_2Y_2$, $O_3Y_3$ so that the moving flap (s) is/are urged automatically back into a predetermined angular orientation when the flow-rate of the stream of cool air is zero, the predetermined angular orientation enabling the moving flap(s) to maximize closing-off of the mouth of the air inlet.

Such a center of gravity that is offset relative to the second axis of rotation $O_1Y_1$, $O_2Y_2$, $O_3Y_3$ then makes it possible to generate unbalance that, by means of the Earth's gravitational force, makes it possible to cause the moving flap(s) to pivot about its/their respective second axis of rotation $O_1Y_1$, $O_2Y_2$, $O_3Y_3$. Such pivoting towards the predetermined angular orientation then takes place automatically, for example, so as to close the mouth of the air inlet completely or partially while it is not being used, while it is being maintained, or merely while it is standing by for the rotorcraft to be in a flight phase.

In another example of the invention, for each moving flap, the device may have at least one resilient means suitable for urging the moving flap(s) back into a predetermined angular position when the flow-rate of the stream of cool air is zero, the predetermined angular orientation enabling the moving flap(s) to maximize closing-off of the mouth of the air inlet.

In other words, the resilient return means can make it possible to urge the moving flap(s) automatically back into the predetermined angular orientation. The resilient return means may also be combined with a center of gravity that is offset, e.g. for the purpose of making closure of the mouth of the air inlet faster when the flow-rate of the incident stream of cool air is zero.

Furthermore, such resilient return means may, for example, be in the form of one or more helical or spiral springs that are urged in traction, in compression, or indeed in torsion.

BRIEF DESCRIPTION OF THE DRAWINGS

The invention and its advantages appear in greater detail from the following description of examples given by way of illustration with reference to the accompanying figures, in which.

DETAILED DESCRIPTION OF THE INVENTION

Elements present in more than one of the figures may be given the same references in each of them.

As indicated above, the invention relates to a rotorcraft having at least one rotor that at least participates in providing lift, and may also participate in providing propulsion, for the rotorcraft in the air.

Figure 1:
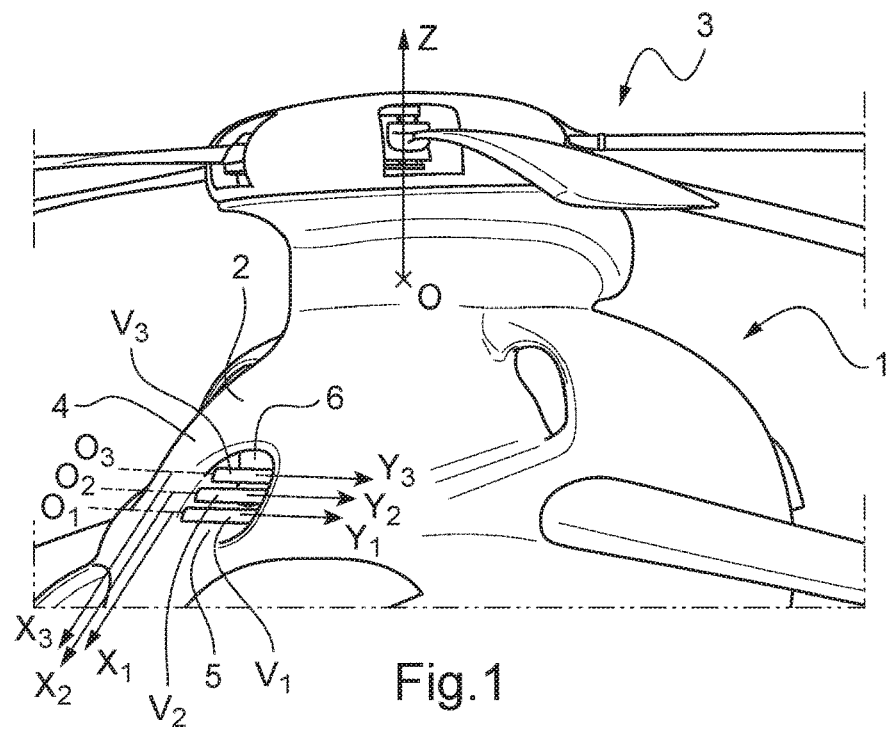
FIG. 1 is a perspective view of a rotorcraft of the invention.

As shown in FIG. 1, such a rotorcraft 1 may have an aerodynamic device 2 arranged below the rotor 3.

This rotor 3 rotates about a first a first axis of rotation OZ that, for example, extends substantially vertically while the rotorcraft 1 is standing on a horizontal support. Furthermore, the aerodynamic device 2 has a fairing 4 that is provided with at least one air inlet 5 making it possible for a stream of cool air to flow from a region situated outside the rotorcraft 1 to another region that is situated inside the rotorcraft 1.

As shown, such an air inlet 5 may, for example, make it possible to feed cool air to a heat exchanger of the air-oil type designed to cool a lubricating oil of an engine or of a main gear box of the aircraft 1. Such members (not shown) may be arranged under the fairing 4.

The air inlet 5 thus has a mouth 6 at which the aerodynamic device 2 has at least one moving flap V1, V2, V3 mounted to move in rotation. As shown, the three moving flaps V1, V2, and V3 respectively have at least one degree of freedom to move in rotation about a second axis of rotation $O_1Y_1$, $O_2Y_2$, $O_3Y_3$ relative to the fairing 4.

Thus, the three moving flaps V1, V2, and V3 may orientate themselves automatically and passively as a function of a current orientation of the stream of cool air at the mouth 6 of the air inlet 5. Furthermore, the second axes of rotation $O_1Y_1$, $O_2Y_2$, $O_3Y_3$ are arranged in planes $X_1O_1Y_1$, $X_2O_2Y_2$, $X_3O_3Y_3$ that are oriented perpendicularly relative to the first axis of rotation OZ.

In addition, a first moving flap V1 and a second moving flap V2 may be free to orient themselves individually in at least two mutually distinct angular orientations about respective ones of the second axes of rotation $O_1Y_1$ and $O_2Y_2$.

Alternatively, the first moving flap and the second moving flap may also pivot together into the same angular orientation about respective ones of the second axes of rotation $O_1Y_1$, $O_2Y_2$. In this situation, connecting rods (not shown) may, for example, make it possible to constrain the first and second moving flaps to move together.

Furthermore, and as shown, the second axes of rotation $O_1Y_1$ and $O_2Y_2$ may be arranged to be mutually parallel at the mouth 6 of the air inlet 5.

In addition, all three moving flaps V1, V2, and V3 may pivot about respective ones of second axes of rotation $O_1Y_1$, $O_2Y_2$, and $O_3Y_3$. These three second axes of rotation $O_1Y_1$, $O_2Y_2$, and $O_3Y_3$ may then advantageously be arranged in coplanar manner.

In such an embodiment, the first and second moving flaps V1 and V2 may be chosen to be mutually identical.

Figure 2:
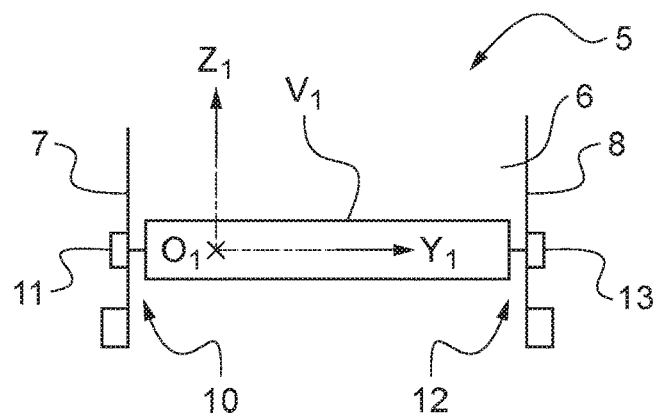
FIG. 2 is a front view of a first variant of the aerodynamic device of the invention.

As shown in FIG. 2, in a first variant of the aerodynamic device 4, a moving flap V1 may extend longitudinally at the mouth 6 of the air inlet 5 between two faces 7 and 8 arranged facing each other.

In this first variant, a first end 10 of the moving flap V1 then co-operates with a first bearing 11 arranged in a first face 7, and a second end 12 of the moving flap V1 co-operates with a second bearing 13 arranged in a second face 8. In addition, the first and second bearings 11 and 13 may then be arranged in alignment on the second axis of rotation $O_1Y_1$.

Figure 3:
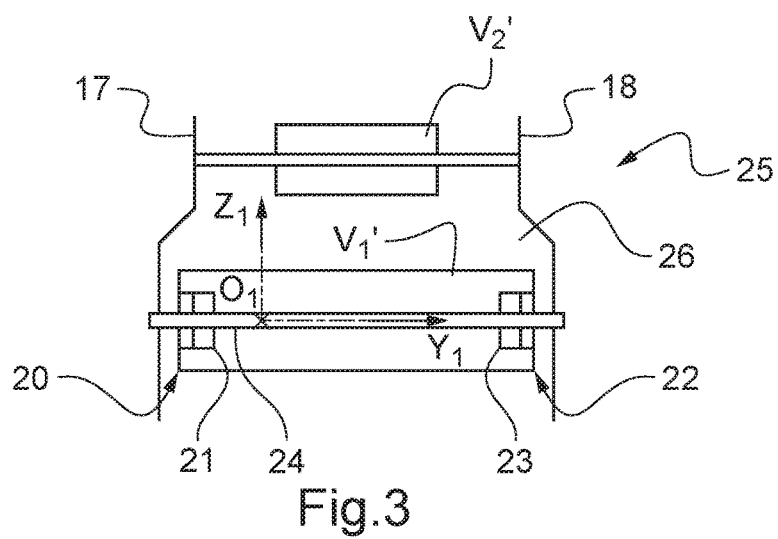
FIG. 3 is a front view of a second variant of the aerodynamic device of the invention.

As shown in FIG. 3, and in a second variant of the aerodynamic device 4, a moving flap V1' may extend longitudinally at a mouth 26 between two facing faces 17 and 18 of an air inlet 25. In this situation, a first end 20 of the moving flap V1' may co-operate with a first bearing 21 arranged on a stationary pin 24 that passes through the moving flap V1', and a second end 22 of the moving flap V1' may co-operate with a second bearing 23 arranged on the stationary pin 24.

Similarly, the first and second bearings 21 and 23 may then be arranged in alignment on the second axis of rotation $O_1Y_1$, $O_2Y_2$, $O_3Y_3$.

Furthermore, and as shown, the first and second moving flaps V1' and V2' may be distinct from each other and have different lengths along their respective second axes of rotation $O_1Y_1$ and $O_2Y_2$.

Figure 4:
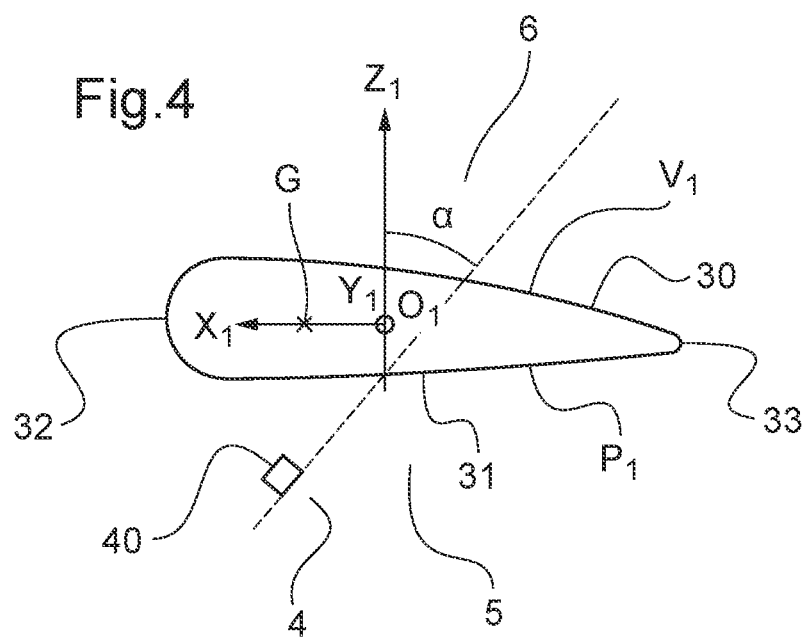
FIG. 4 is a cross-section view of a first embodiment of a moving flap of the invention.

As shown in FIG. 4, and in a first embodiment, a moving flap V1 may have a plurality cross-sections that are perpendicular to the second axis of rotation $O_1Y_1$, each of which has the same aerodynamic profile P1.

Furthermore, the moving flap V1 may be of a streamlined type. Thus, the moving flap V1 has firstly a top skin 30 and a bottom skin 31, and secondly a leading edge 32 interconnecting the top skin 30 and the bottom skin 31, and a trailing edge 33 interconnecting the top skin 30 and the bottom skin 31. Such a leading edge 32 and such a trailing edge 33 may then extend substantially longitudinally along the second axis of rotation $O_1Y_1$.

Furthermore, in the plane of FIG. 4, corresponding to the plane $X_1O_1Z_1$, the mouth 6 points towards a front region of the rotorcraft and is inclined upwards at an angle $\alpha$ relative to an axis in elevation $O_1Z_1$. Such an angle $\alpha$ may lie in the range 1° to 89°, and preferably lies in the range 20° to 60°, in such a manner as to cause a cross-sectional area through which cool air can pass at the mouth 6 to vary as a function of the angle of incidence of the stream of cool air at the mouth 6.

In addition, the aerodynamic device 2 may have at least one abutment member 40 suitable for angularly limiting the degree of freedom of movement in rotation of the moving flap V1 relative to the fairing 4.

Moreover, such a moving flap V1 has a center of gravity G that may be arranged in such a manner as to be radially offset relative to the second axis of rotation $O_1Y_1$ and, for example, positioned between the leading edge 32 and the second axis of rotation $O_1Y_1$. In this way, the Earth's gravitational force applied to the moving flap V1 makes it possible to urge the moving flap V1 automatically back into a predetermined angular orientation when the flow rate of the stream of cool air is zero.

Advantageously, such a predetermined angular orientation enables the moving flap V1 to maximize closing-off of the mouth 6 of the air inlet 5.

Figure 5:
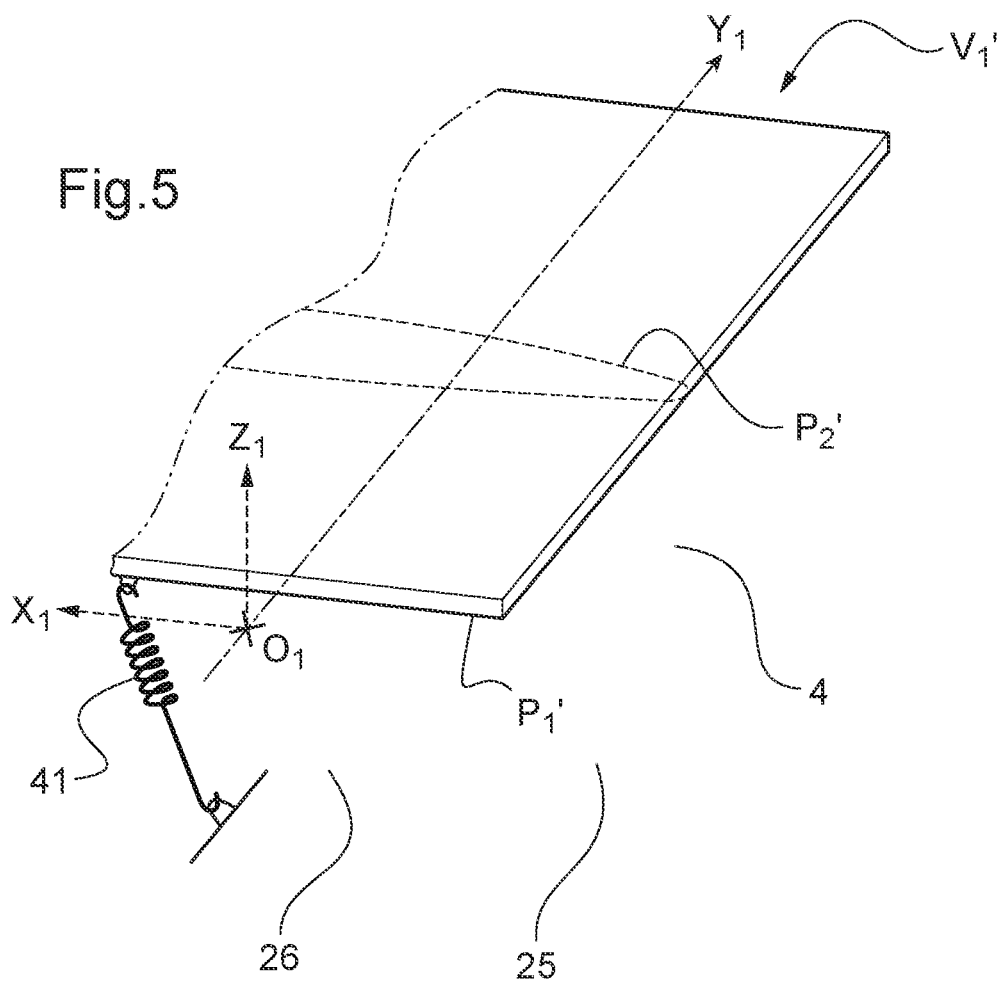
FIG. 5 is a perspective view of a second embodiment of a moving flap of the invention.

As shown in FIG. 5, and in a second embodiment, a moving flap V1' may have a plurality cross-sections that are perpendicular to the second axis of rotation $O_1Y_1$. Such a plurality of cross sections may then have at least two mutually distinct profiles P1' and P2'.

In this second embodiment, the moving flap V1' may also have a plane shape extending substantially longitudinally along the second axis of rotation $O_1Y_1$.

Additionally or alternatively, the aerodynamic device 4 may also have at least one resilient return means 41 making it possible to urge the moving flap V1' back into a predetermined angular orientation when the flow rate of the stream of cool air is zero.

Such a predetermined angular orientation may enable the moving flap V1' to maximize closing-off of the mouth 26 of the air inlet 25.

Figure 6:
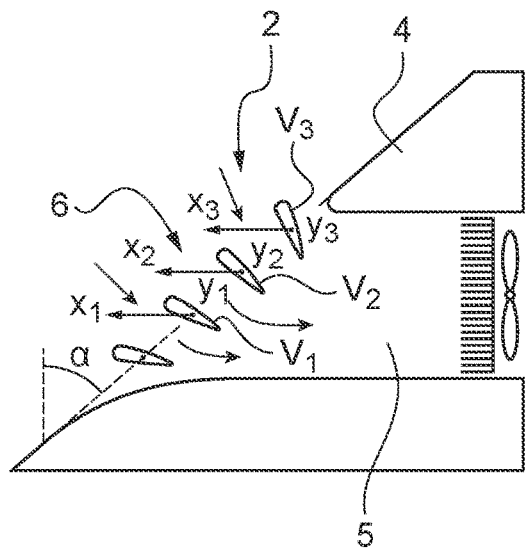
FIG. 6 is a cross-section view showing a first angular orientation of the moving flaps of the invention.
Figure 7:
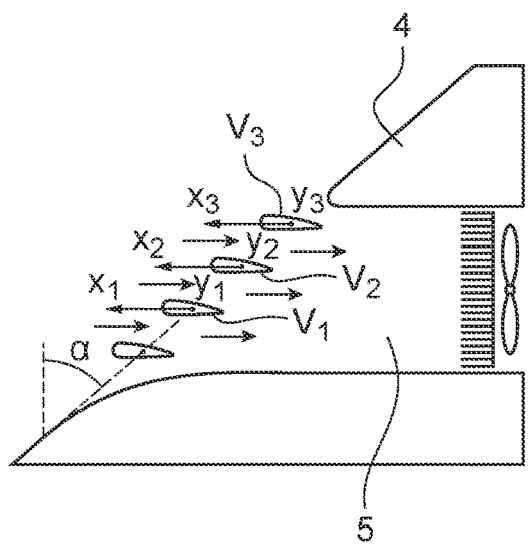
FIG. 7 is a cross-section view showing a second angular orientation of the moving flaps of the invention.
Figure 8:
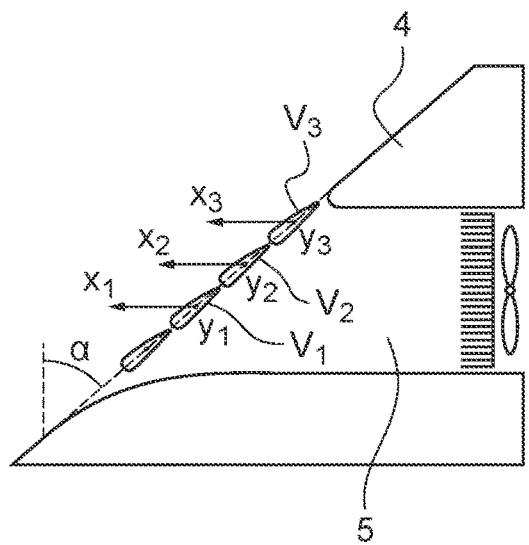
FIG. 8 is a cross-section view showing a third angular orientation of the moving flaps of the invention.

Furthermore, and as shown in FIGS. 6 to 8, the moving flaps V1, V2, and V3 are suitable for pivoting freely about their respective second axes of rotation $O_1Y_1$, $O_2Y_2$, and $O_3Y_1$ between at least three distinct angular orientations as a function of the angle of incidence of the stream of cool air at the mouth 6. Such a mouth 6 is also, as shown, significantly inclined upwards at an angle $\alpha$ relative to an axis in elevation $O_1Z_1$.

Thus, as shown in FIG. 6, when the moving flaps V1, V2, and V3 of the streamlined type are in a first angular orientation, and when the stream of cool air is mainly oriented in the direction extending downwards from top to bottom of the rotorcraft 1, the leading edge 32 of each moving flap V1, V2, and V3 is then arranged in a horizontal plane that is situated above another horizontal plane containing the trailing edge 33, and that extends perpendicularly relative to the first axis of rotation OZ, the two horizontal planes extending on either side of the respective one of the planes $X_1O_1Y_1$, $X_2O_2Y_2$, and $X_3O_3Y_3$.

As shown in FIG. 7, in a second angular orientation, when the stream of cool air is mainly oriented in the direction extending from the front to the rear of the rotorcraft 1, the leading edges 32 and the trailing edges 33 of the moving flaps V1, V2, and V3 are then arranged in respective ones of the planes $X_1O_1Y_1$, $X_2O_2Y_2$, and $X_3O_3Y_3$.

As shown in FIG. 8, in a third angular orientation, when the flow-rate of the stream of cool air is zero, the leading edge 32 of each moving flap V1, V2, and V3 is then arranged in a horizontal plane situated below another horizontal plane containing the trailing edge 33, the two horizontal planes extending on either side of the respective one of the planes $X_1O_1Y_1$, $X_2O_2Y_2$, and $X_3O_3Y_3$.

Naturally, the present invention can be the subject of numerous variants as to its implementation. Although several embodiments are described, it should readily be understood that it is not conceivable to identify exhaustively all possible embodiments. It is naturally possible to envisage replacing any of the means described by equivalent means without going beyond the ambit of the present invention.

What is claimed is:

1. A rotorcraft comprising:
    a rotor for providing at least lift for the rotorcraft in the air, the rotor being mounted to rotate about a first axis of rotation;
    an aerodynamic device arranged below the rotor,
    the aerodynamic device comprising a fairing provided with at least one air inlet for enabling a stream of cool air to flow from a region that is situated outside the rotorcraft to another region that is situated inside the rotorcraft;
    wherein at least at a mouth of the at least one air inlet in the fairing, the aerodynamic device comprises at least one moving flap that is mounted to move in rotation, the at least one moving flap having at least one degree of freedom of movement in rotation about a second axis of rotation relative to the fairing, the at least one moving flap orienting itself automatically and passively as a function of a current orientation of the stream of cool air at the mouth of the air inlet, and the second axis of rotation being arranged in a plane that extends perpendicularly relative to the first axis of rotation;
    wherein the at least one moving flap extends longitudinally between two facing faces that define the air inlet, a first end of the at least one moving flap comprising a first bearing arranged on a stationary pin passing through the at least one moving flap, and a second end of the at least one moving flap comprising a second bearing arranged on the stationary pin, the first and second bearings being arranged in alignment on the second axis of rotation.

2. The rotorcraft according to claim 1, wherein the at least one moving flap includes a first moving flap and a second moving flap, the first and second moving flaps being free to orient themselves individually to take up at least two angular orientations that are mutually distinct about respective ones of the second axes of rotation.

3. The rotorcraft according to claim 1, wherein the at least one moving flap includes a first moving flap and a second moving flap, the first and second moving flaps pivotable into the same angular orientation about respective ones of the second axes of rotation.

4. The rotorcraft according to claim 1, wherein the first bearing is arranged in a first face, and the second bearing is arranged in a second face.

5. The rotorcraft according to claim 1, wherein the at least one moving flap includes a first flap mounted to move in rotation about the second axis of rotation and a second flap mounted to move in rotation about a third axis of rotation, the second and third axes of rotation being arranged to be mutually parallel.

6. The rotorcraft according to claim 1, wherein the at least one moving flap includes a first flap mounted to move in rotation about a second axis of rotation, a second flap mounted to move in rotation about a third axis of rotation, and a third flap mounted to move in rotation about a fourth axis of rotation, the axes of rotation of the first, second, and third moving flaps being arranged in coplanar manner.

7. The rotorcraft according to claim 1, wherein the at least one moving flap has a plurality of cross-sections that are perpendicular to the second axis of rotation, each of the plurality of cross-sections having the same aerodynamic profile.

8. The rotorcraft according to claim 1, wherein the at least one moving flap has a plurality of cross-sections that are perpendicular to the second axis of rotation, the plurality of cross-sections having at least two mutually dissimilar profiles.

9. The rotorcraft according to claim 1, wherein the at least one moving flap includes a first moving flap and a second moving flap, the first and second moving flaps being mutually identical.

10. The rotorcraft according to claim 1, wherein the at least one moving flap includes a first moving flap and a second moving flap, the first and second moving flaps being dissimilar from each other.

11. The rotorcraft according to claim 1, wherein the at least one moving flap is of a streamlined type, the at least one moving flap having firstly a top skin and a bottom skin and secondly a leading edge interconnecting the top skin and the bottom skin and a trailing edge interconnecting the top skin and the bottom skin.

12. The rotorcraft according to claim 1, wherein the at least one moving flap has a plane shape extending substantially longitudinally along the second axis of rotation.

13. The rotorcraft according to claim 1, wherein, for each one of the at least one moving flap, the aerodynamic device comprises at least one abutment member suitable for angularly limiting the at least one degree of freedom of movement in rotation relative to the fairing.

14. The rotorcraft according to claim 1, wherein the at least one moving flap has a center of gravity, the center of gravity being arranged in such a manner so that the at least one moving flap is urged automatically back into a predetermined angular orientation when the flow-rate of the stream of cool air is zero, the predetermined angular orientation enabling the at least one moving flap to maximize closing-off of the mouth of the air inlet.

15. The rotorcraft according to claim 1, wherein, for each of the at least one moving flap, the aerodynamic device comprises at least one resilient means suitable for urging the at least one moving flap back into a predetermined angular position when the flow-rate of the stream of cool air is zero, the predetermined angular orientation enabling the at least one moving flap to maximize closing-off of the mouth of the air inlet.

16. The rotorcraft according to claim 1, wherein the at least one moving flap may have a varying angular orientation between a first orientation and a second orientation depending upon a current orientation of the stream of air at the mouth of the air inlet.

17. A rotorcraft comprising:
    a rotor mounted to rotate about a first axis of rotation to provide lift for the rotorcraft in the air;
    an aerodynamic device arranged below the rotor;
    the aerodynamic device comprising a fairing having an air inlet for enabling a stream of air to flow from outside the rotorcraft to inside the rotorcraft;
    wherein at a mouth of the air inlet in the fairing, the aerodynamic device comprises a moving flap mounted to move in rotation, the moving flap having at least one degree of freedom of movement in rotation about a second axis of rotation relative to the fairing, the moving flap orienting itself automatically and passively as a function of a current orientation of the stream of air at the mouth of the air inlet to enable the size of the cross-sectional area through which the stream of air passes at the mouth to be adapted automatically as a function of the flow-rate and of the orientation of the stream of air at the mouth of the air inlet, and the second axis of rotation arranged in a plane that extends perpendicularly relative to the first axis of rotation, wherein the moving flap may have a varying angular orientation between a first orientation and a second orientation depending upon a current orientation of the stream of air at the mouth of the air inlet;

wherein the at least one moving flap extends longitudinally between two facing faces that define the air inlet, a first end of the at least one moving flap comprising a first bearing arranged on a stationary pin passing through the at least one moving flap, and a second end of the at least one moving flap comprising a second bearing arranged on the stationary pin, the first and second bearings being arranged in alignment on the second axis of rotation.

18. The rotorcraft according to claim 17, further comprising a second moving flap, wherein the moving flap and the second moving flap are free to orient themselves individually to take up at least two angular orientations that are mutually distinct about respective ones of the second axes of rotation.

* * * * *